United States Patent [19]

Carroll

[11] Patent Number: 5,702,011
[45] Date of Patent: Dec. 30, 1997

[54] THIN FLAT PANEL CONSTRUCTION

[75] Inventor: Francis Alfred Carroll, Dublin, Ireland

[73] Assignee: Carroll Products and Designs Limited, Baldoyle, Ireland

[21] Appl. No.: 505,283

[22] PCT Filed: Mar. 24, 1994

[86] PCT No.: PCT/IE94/00017

§ 371 Date: Aug. 15, 1995

§ 102(e) Date: Aug. 15, 1995

[87] PCT Pub. No.: WO94/21927

PCT Pub. Date: Sep. 29, 1994

[30] Foreign Application Priority Data

Mar. 23, 1993 [IE] Ireland ................... S930223

[51] Int. Cl.$^6$ ............................................. A47F 5/00
[52] U.S. Cl. ........................ 211/135; 211/186; 211/189; 108/180
[58] Field of Search ........................ 211/135, 186, 211/133, 163, 189, 205, 182, 72; 108/180; 312/140, 265.5

[56] References Cited

U.S. PATENT DOCUMENTS

| | | | |
|---|---|---|---|
| 1,716,964 | 6/1929 | Kuck ..................... | 211/135 X |
| 2,366,676 | 1/1945 | Rosenthal ................. | 108/180 |
| 2,595,002 | 4/1952 | Schneider ................. | 211/186 |
| 3,848,942 | 11/1974 | Fanini . | |
| 4,043,456 | 8/1977 | Howell ..................... | 312/140 X |
| 4,372,522 | 2/1983 | Simeonoff .................. | 211/186 X |
| 4,527,697 | 7/1985 | Mastrodicasa . | |
| 4,650,261 | 3/1987 | Winter et al. . | |
| 4,874,210 | 10/1989 | Carroll . | |
| 4,906,824 | 3/1990 | Carroll . | |
| 4,926,759 | 5/1990 | Vitsky et al. .............. | 108/180 |
| 4,938,366 | 7/1990 | Carroll . | |
| 5,314,081 | 5/1994 | Carroll . | |

FOREIGN PATENT DOCUMENTS

| | | |
|---|---|---|
| 705237 | 3/1968 | Belgium . |
| 2191635 | 2/1974 | France . |
| 2585090 | 1/1987 | France . |
| 6403253 | 9/1964 | Netherlands . |
| 2088013 | 6/1982 | United Kingdom . |
| 2225710 | 7/1992 | United Kingdom . |

*Primary Examiner*—Robert W. Gibson, Jr.
*Attorney, Agent, or Firm*—Hoffmann & Baron, LLP

[57] ABSTRACT

A construction including at least two thin panels (1,2) of lightweight material which are engaged to one another by at least one connector (10) manufactured from a tough material such as polycarbonate. The connector has a socket (11) rigidly secured to the panel (2), and a resilient clip (13) disengagedly connected to the second panel (1) through an orifice (19) in the second panel (1). The construction can be configured in many different ways to provide display units, merchandising units and multi-sided units. For example, for merchandising or display purposes, the construction may be in the forms of a cube structure (221) or a cruciform-type quad structure (241), and for display or barrier purposes, the construction may be configured as a wall (291).

17 Claims, 20 Drawing Sheets

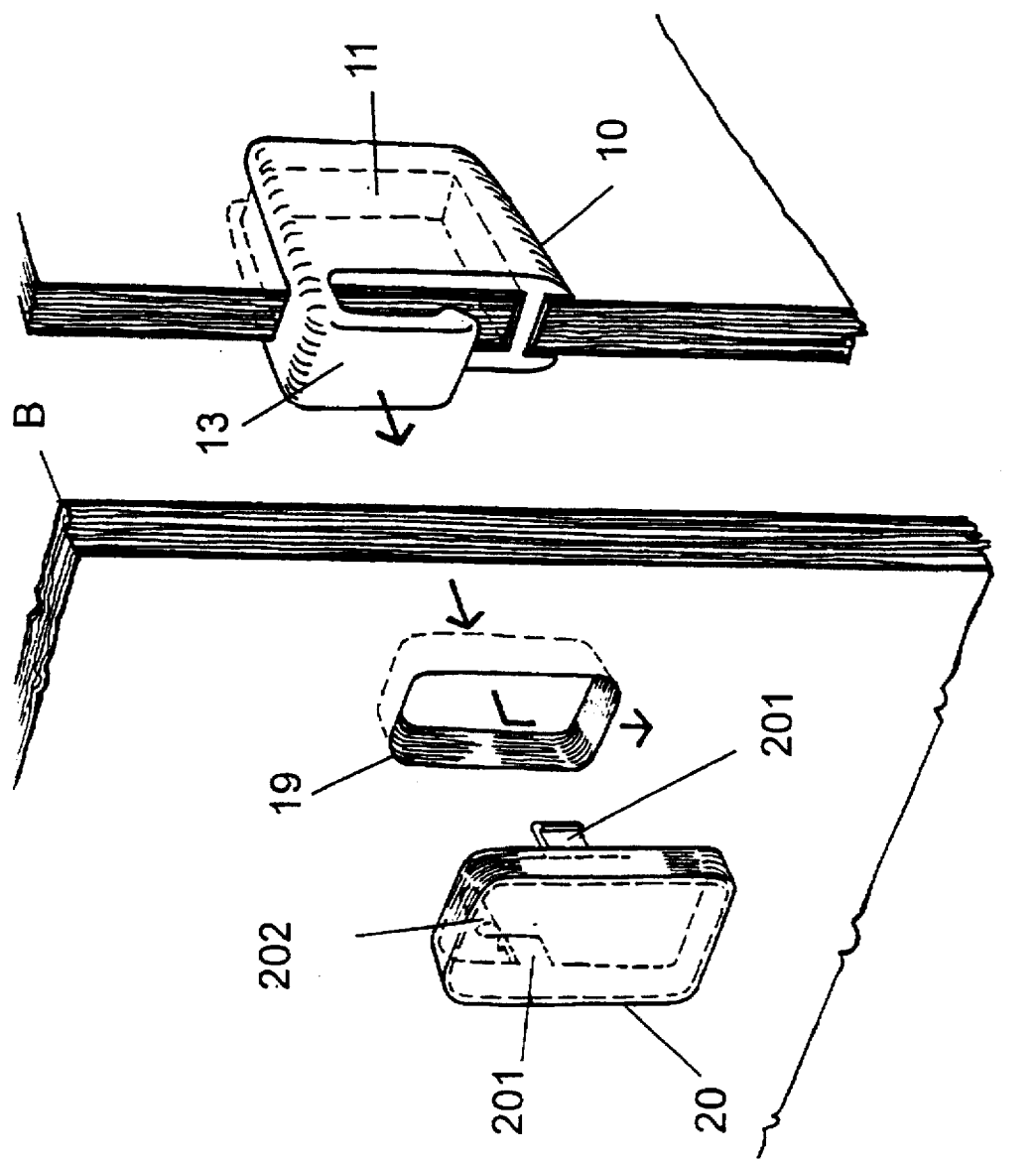

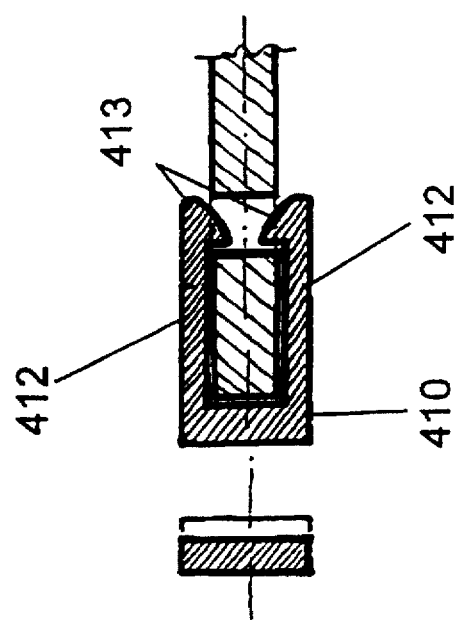
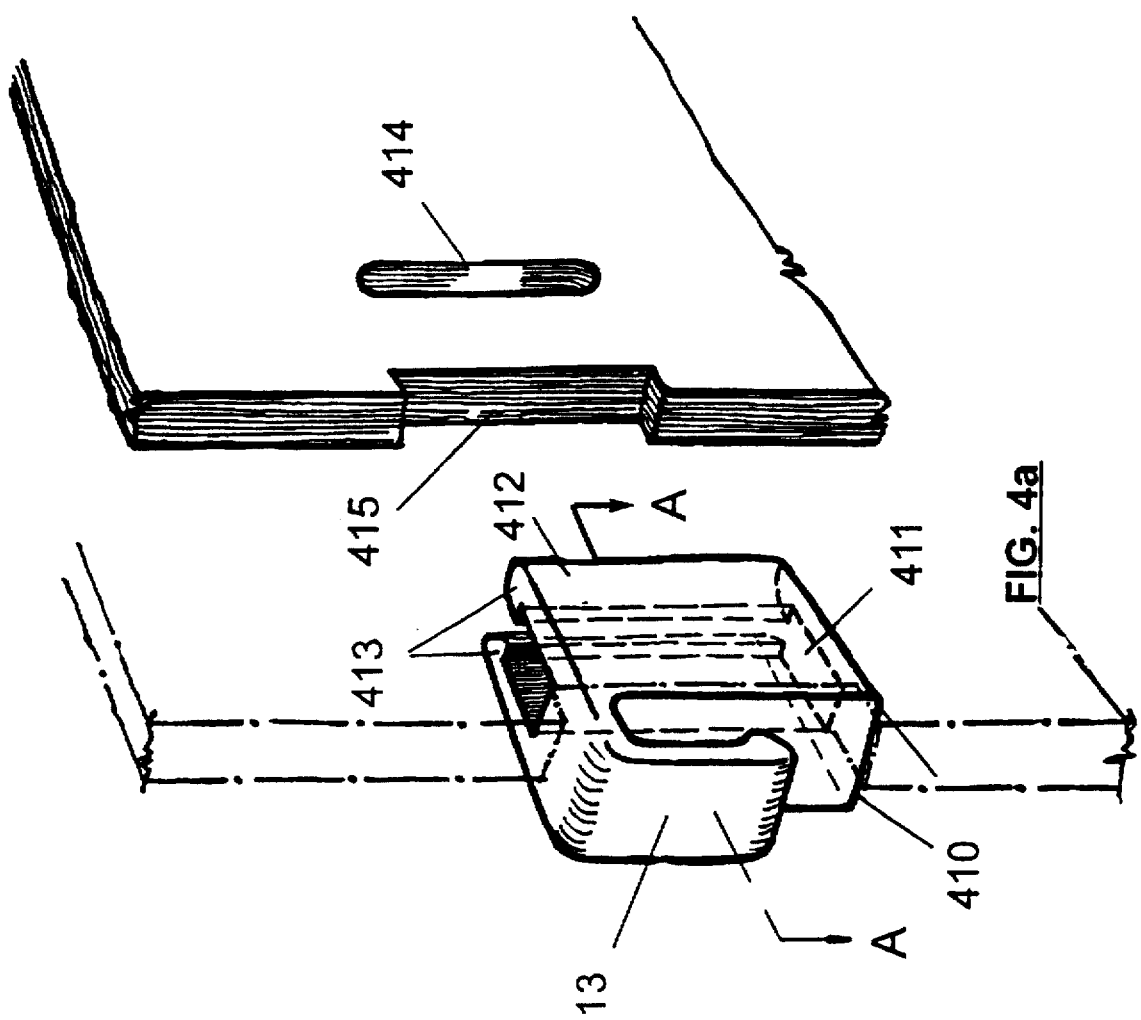
FIG. 4b
FIG. 4a

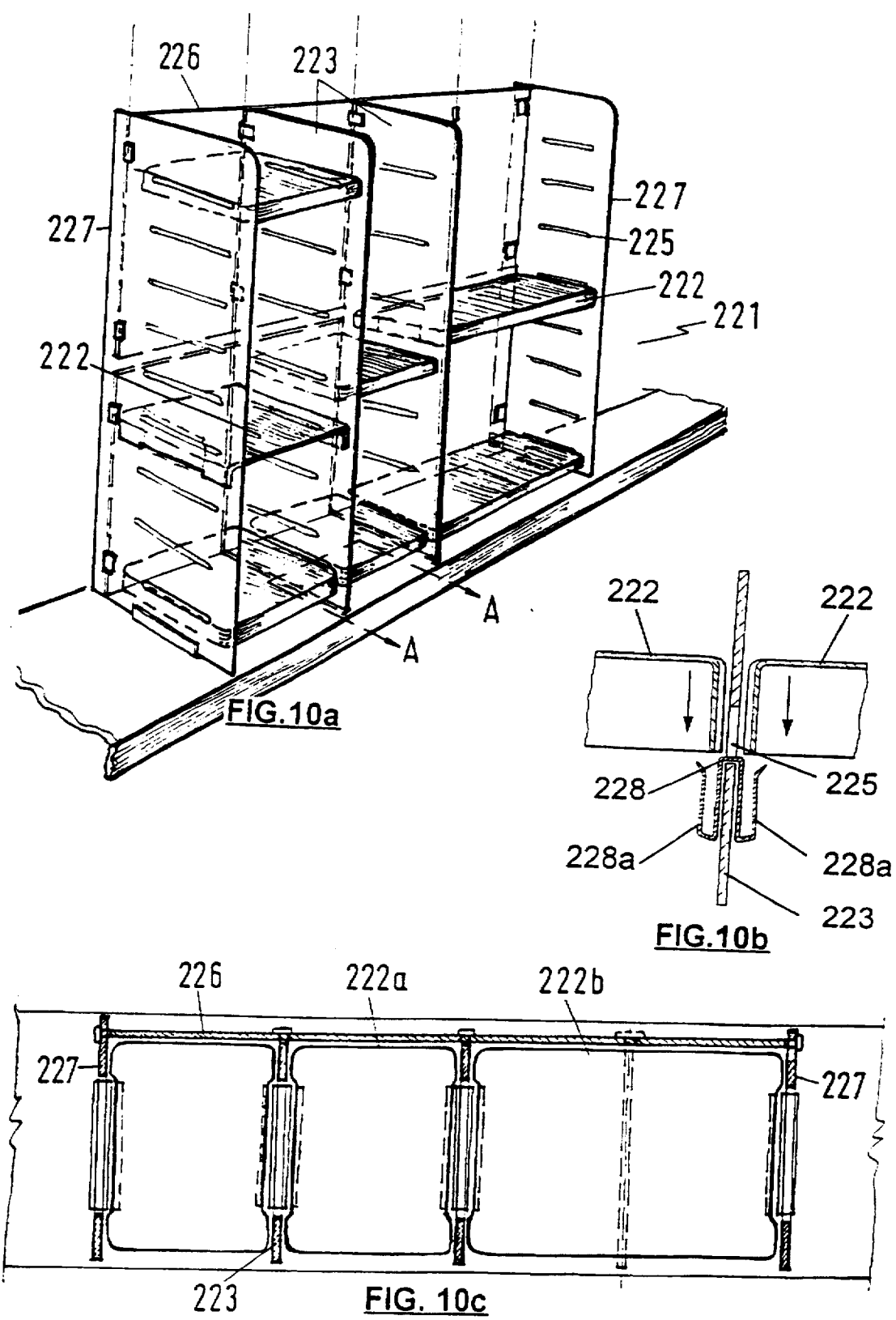

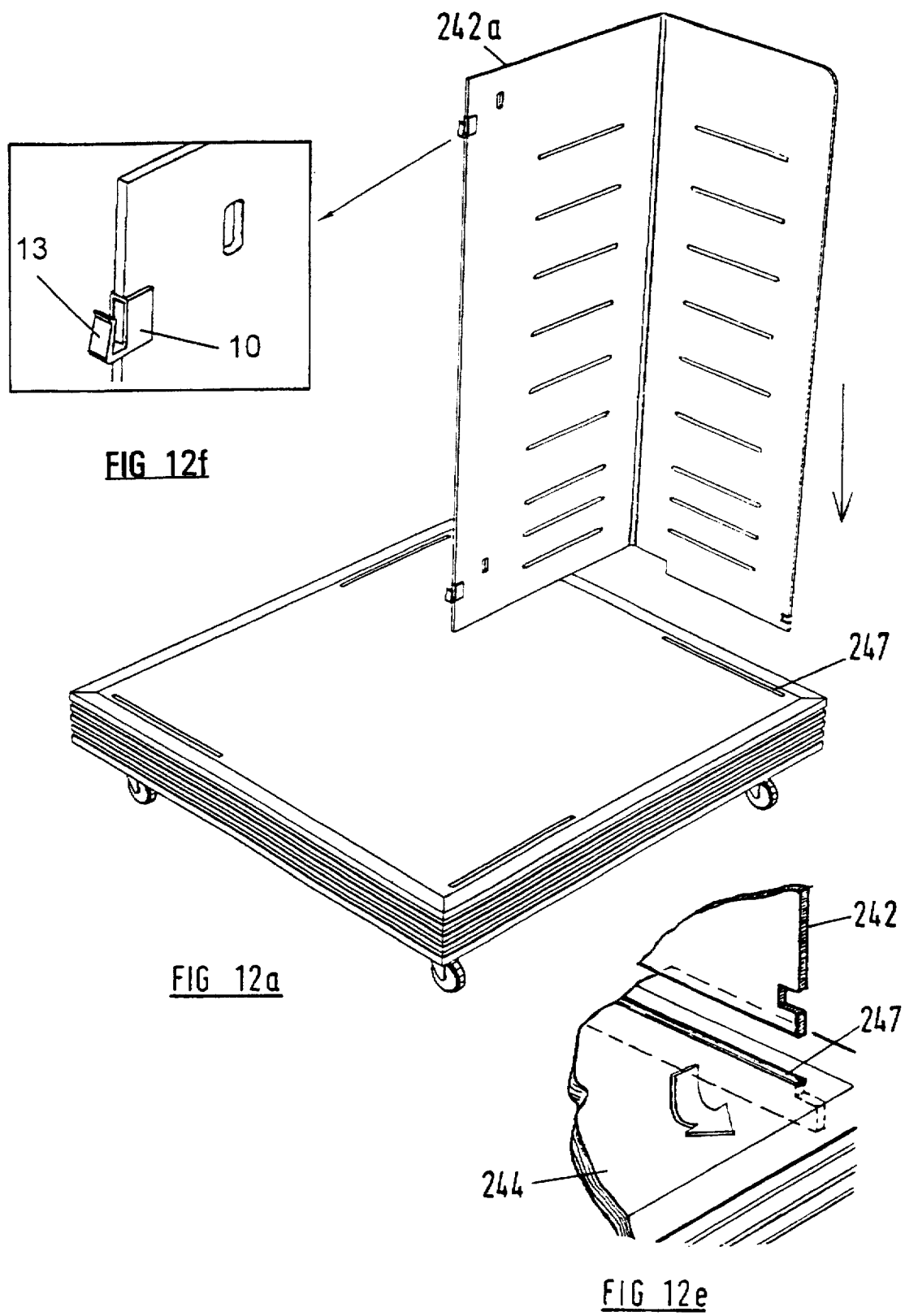

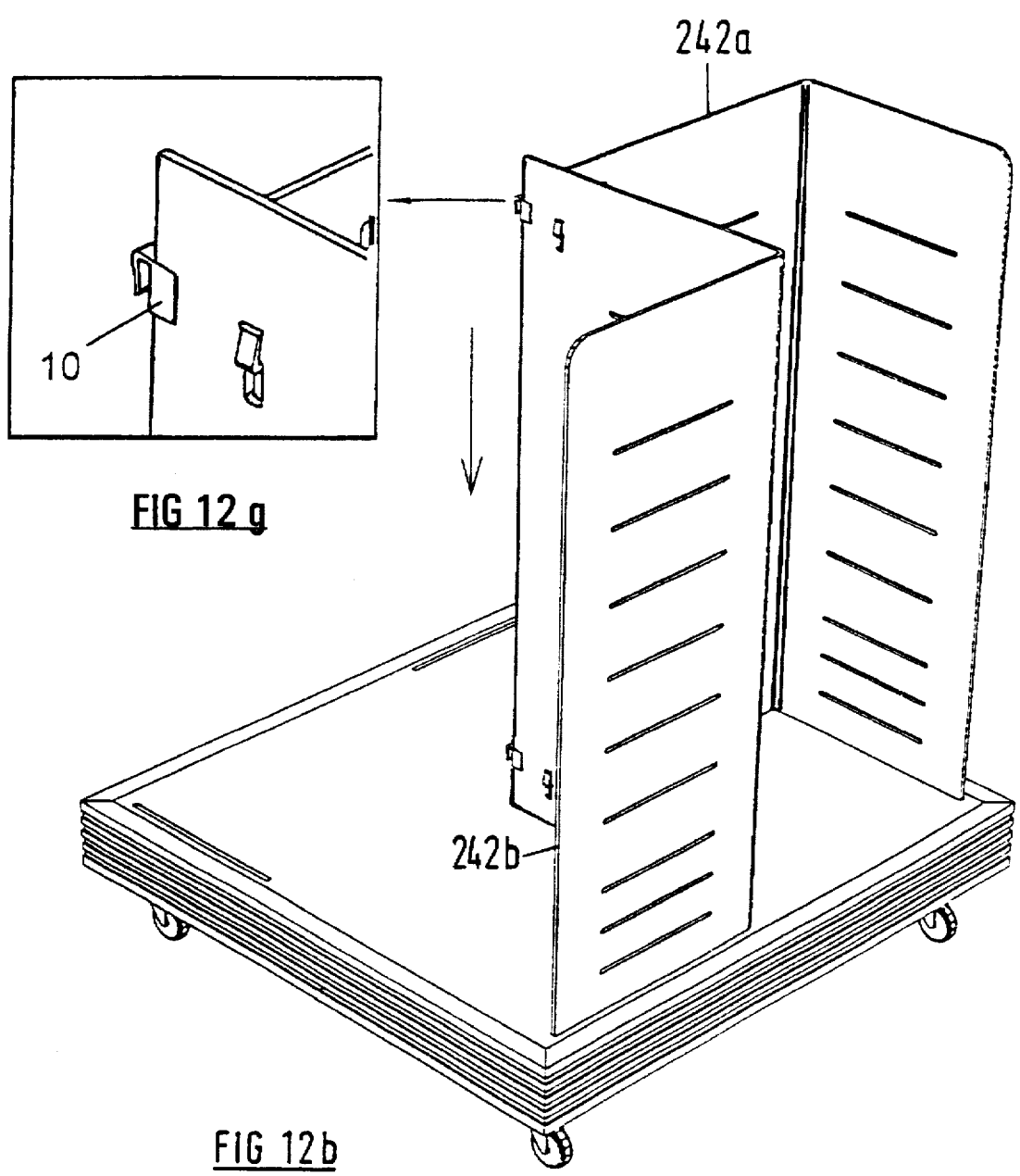

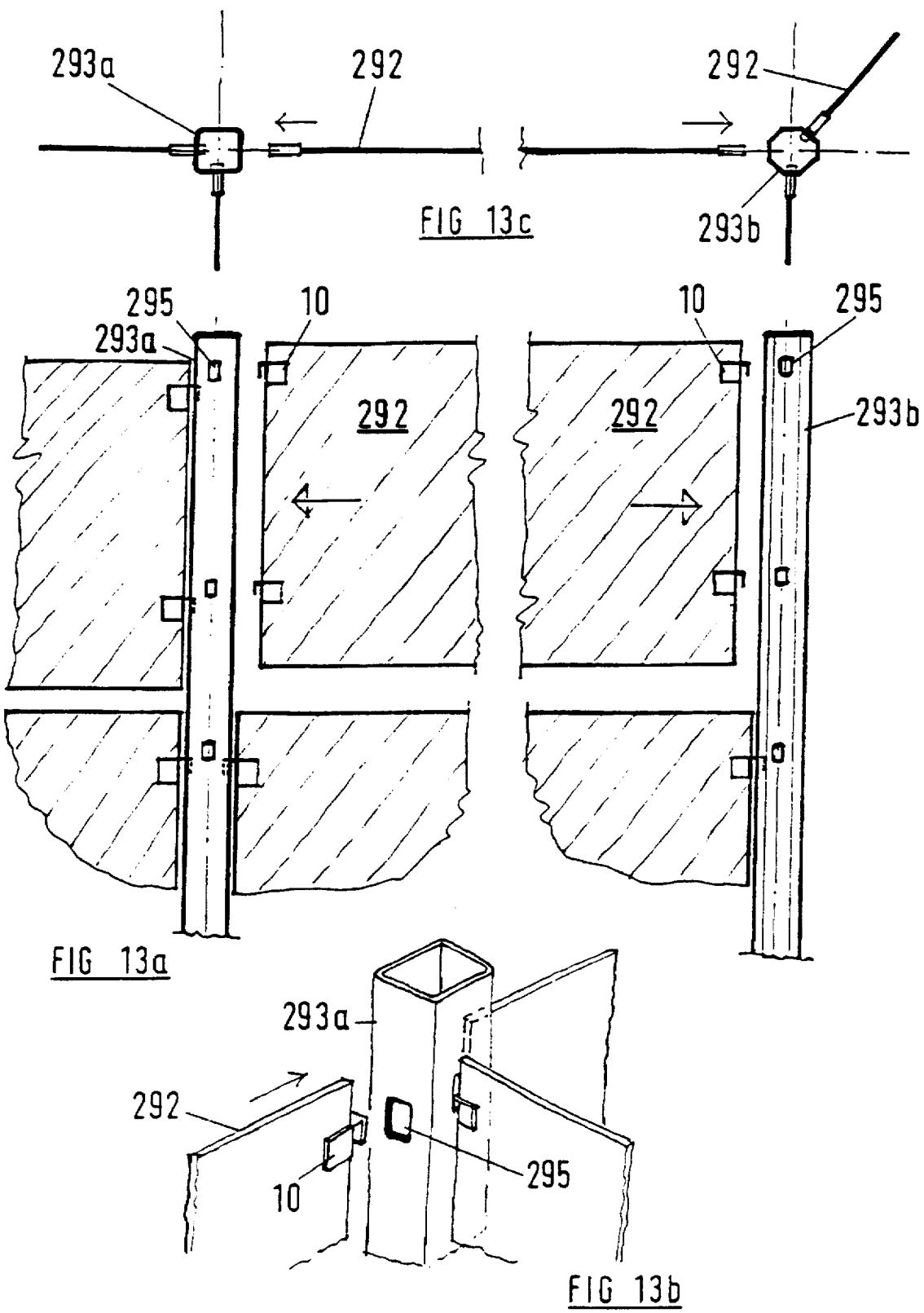

THIN FLAT PANEL CONSTRUCTION

The present invention relates to a thin flat panel construction and method for the provision of light modular knock-down structures designed to support a wide range of modern lightweight merchandising or display systems and products (hereinafter referred to as "Merchandising Products") currently used in the retail industry but also suitable for many other diverse applications where support structures or integrated support means are required to create free standing load bearing structures for diverse usage in the retail industry and elsewhere.

Prior Art constructions of free standing structures in the retail industry fall broadly into the following general categories:

(a) Metal frames with sheet metal cladding
(b) Metal frames with wire mesh cladding
(c) Metal frames with timber cladding
(d) Timber frames with timber cladding
(e) Timber or metal frames with glass cladding Despite many advances and innovative developments in all these traditional construction methods, many inherent disadvantages still remain rendering the structures unsuitable for the support of the Merchandising Products for some of or all the following reasons:

expensive to manufacture bulky and heavy to pack, store and ship visually unattractive inefficient for short run production inflexible in use require expertise for assembly incompatible for use with many modern lightweight materials Referring to the latter, the use of clear plastic sheet materials, e.g. acrylic, for merchandising and display systems and products has escalated in recent years due to the suitability of the material for the purpose and the introduction of new innovative modular designs offering major benefits to the retailer in terms of:

improved product presentation more efficient space utilisation flexibility for seasonal changes compatibility with traditional shelving equipment improved product management and stock control Merchandising Products were heretofore designed to hang on or be supported by traditional in store shelving systems found in the majority of retail outlets, thus restricting their use to locations where existing structures were in place and available for use.

The main object of the present invention is towards providing a construction system to support merchandising products which system is itself modular, light weight, flexible in use and capable of being used, in its own right, as a merchandising and/or display system. Also, the object of the invention is to provide a construction which is cheap and efficient to manufacture, ideally, on similar equipment used in the manufacture of the Merchandising Products referred to.

FR-A-2585090 and U.S. Pat. No. 4,650,261 disclose the prior art relating to the precharacterising portion of the following statements of invention.

The present invention provides a construction comprising at least two thin panels of a lightweight material of a planar or non-planar configuration disengageably connected together by a connector means, said connector means including a connector having two portions, characterised in that one portion is rigidly secured to the first panel and the other portion is disengageably connected to the second panel through an orifice provided in the second panel.

Advantageously, the first portion of the connector is in the form of a socket securable to a formation on the first panel and the second portion is in the form of a resilient clip extendable through the orifice and resiliently engageable across the thickness of the second panel.

Preferably, the formation on the first panel comprises a tongue formed between two slots, and the socket is engageable over the tongue and is securable thereto by an interference fit, glue, mechanical or any other suitable fixing means.

Conveniently, the socket includes two pairs of flanges, one at each side thereof, with each flange extending beyond the slots forming the tongue on the first panel so as to reinforce the tongue and consequently the structure.

Advantageously, a plug, cap, or similar element is inserted into the orifice to prevent disengagement of the two panels.

Alternatively, the formation on the first panel comprises a slot and the socket is engageable with the slot by complementary fixing means, such as snap-fit teeth, the first panel being provided with a cut out portion in its edge into which the socket nests to provide a flush edge in the finished construction.

Preferably, the structure formed by the panels connected together is provided with additional means to support a particular merchandising apparatus, equipment, device or component parts of same.

Conveniently, a component in the form of a bracket is connected to at least one panel and to a further panel in the form of a tray, shelf or rack by means of a socket or channel provided in the bracket, the bracket extending through a slot in the first panel for supporting the tray, shelf or rack.

Advantageously, the construction is in the form of a merchandise or display support having at least one cube section comprising at least two merchandise or display support members connected between a pair of generally vertical panels.

Preferably, the or each cube is formed by the interconnection of a pair of generally vertically disposed panels, a back panel and two merchandise or display support members.

The present invention also provides a construction comprising at least one thin panel of a planar or non-planar configuration of a lightweight material and an elongate hollow body of a lightweight material disengageably connected together by a connector, the first portion of which is rigidly secured to the thin panel and the second portion being disengageably connected to the hollow body through an orifice provided in the hollow body.

The present invention further provides a construction comprising at least two non-planar shaped panels of lightweight material connected together about a central axis by connector means secured through an orifice in each panel, each panel having at least one connector, the first portion of which is rigidly secured to a first panel and the other portion being disengagably connected to a second panel through an orifice provided on the second panel.

The present invention further provides a construction comprising four generally L-shaped panels connected together about a central axis and includes a base and locking means for securing the at least one thin panel to the base.

The present invention also provides a method of assembling a construction from at least two thin panels of a planar or non-planar configuration for a display support or merchandise support for use in merchandising, the method comprising disengageably connecting the two panels together by a connector means which includes a connector having two portions, characterised by providing a formation on a first panel, rigidly securing a first portion of a connector device to the formation, providing an orifice in a second panel, passing a second portion of the connector through the orifice and disengageably connecting the second portion of the connector to the second panel.

Modern developments in the manufacture of strong lightweight thin flat panels in various materials and combinations of materials have provided the basic structural elements for the invention. Suitable materials include but are not limited to the following:

"ALUCOBOND" sheet comprising wafer thin aluminium sheets laminated to a core of polyethylene plastic.

"FIBREBOARD" sheet comprising highly compressed timber pulp in mill finish or laminated with veneer.

"FOAMEX" rigid foamed PVC sheet and similar plastic sheets.

"PERSPEX" cast and extruded acrylic sheet and similar plastic sheets.

Traditional plywood sheet and the like.

(ALUCOBOND, FIBREBOARD, FOAMEX and PERSPEX are all trade names).

All the foregoing and similar rigid flat panel materials are ideal for the creation of modular lightweight structures, which would be compatible with the Merchandising Products referred to and also compatible with modern retail interior design requirements. However, it has been found in the prior art that no satisfactory jointing system is available to connect and disconnect thin panels as required for modular knock-down construction. While numerous jointing systems are available for thick flat panels of 12 mm and over, none are available for the thin (3 mm–8 mm) panels which are required in these applications. Furthermore the jointing systems designed for thick panels cannot be scaled down to fit 3 mm to 8 mm panels as they are too thin to accommodate them.

The invention thus presents a solution to the problem of connecting thin flat panels together in a modular demountable structural system and furthermore provides connection means for the integrated support of known merchandising systems (e.g. gravity feed apparatus, display rack apparatus for flat or flat packed products such as disclosed in our published European Patent Application No. 0 295 869 A, United Kingdom Patent Application No. 2 225 710 A and International Patent Application No. WO93/17606, the disclosures of which are incorporated herein by reference).

The structures thus created have major advantages over prior art structures in terms of modularity, light weight, strength, flexibility, visual attractiveness and compatibility with known modular merchandising systems and similar products. In addition, many other applications are envisaged for the use of this construction concept illustrated in the drawings accompanying this application but not confined only to these applications or this industry sector.

The present invention uses thin flat panels machined with various slots either in multiple form for standard construction systems or in specific locations to suit special or contract constructions. The slots accommodate various connectors for joining the panels together and also for the connection of the Merchandising Products and various other systems and components directly to the structure.

The invention will hereinafter be more particularly described with reference to the accompanying drawings which show by way of example only, various embodiments of thin panel constructions according to the invention and a number of components used to produce such constructions.

In the drawings:

FIG. 2a is a perspective view of a vertical panel connector clip used to produce constructions according to the invention, with the connector clip mounted on a vertical panel in a position to engage with an orifice on a second panel at right angles to the first panel, a snap in locking cap completes the assembly;

FIG. 2b is a section through the two connected panels and the components of the connection of FIG. 2a;

FIG. 4a is an exploded view of an alternative embodiment of a vertical panel connector clip and panel;

FIG. 4b is a section through the connector clip of FIG. 4a, connected onto the panel;

FIG. 10a is a perspective view of a cube display constructed according to the invention and including horizontal shelf units and vertical dividers;

FIG. 10b is a plan view of the display of FIG. 10a;

FIG. 10c is a cross-sectional view of the line A—A of FIG. 10a;

FIGS. 12a, 12b, 12c and 12d are perspective views illustrating the assembly of the quad display shown in FIG. 11 and FIG. 12e is a perspective view of an anchor detail of the quad display;

FIGS. 12f and 12g are perspective views of the edge connectors shown in FIGS. 12a and 12b;

FIG. 13a is a front view of multi-sided construction according to the invention from flat panels and two vertical tubes;

FIG. 13b is a perspective view of the panel-to-tube connection in FIG. 13a; and

FIG. 13c is a plan view of the barrier of FIG. 13a.

Figure 1A:
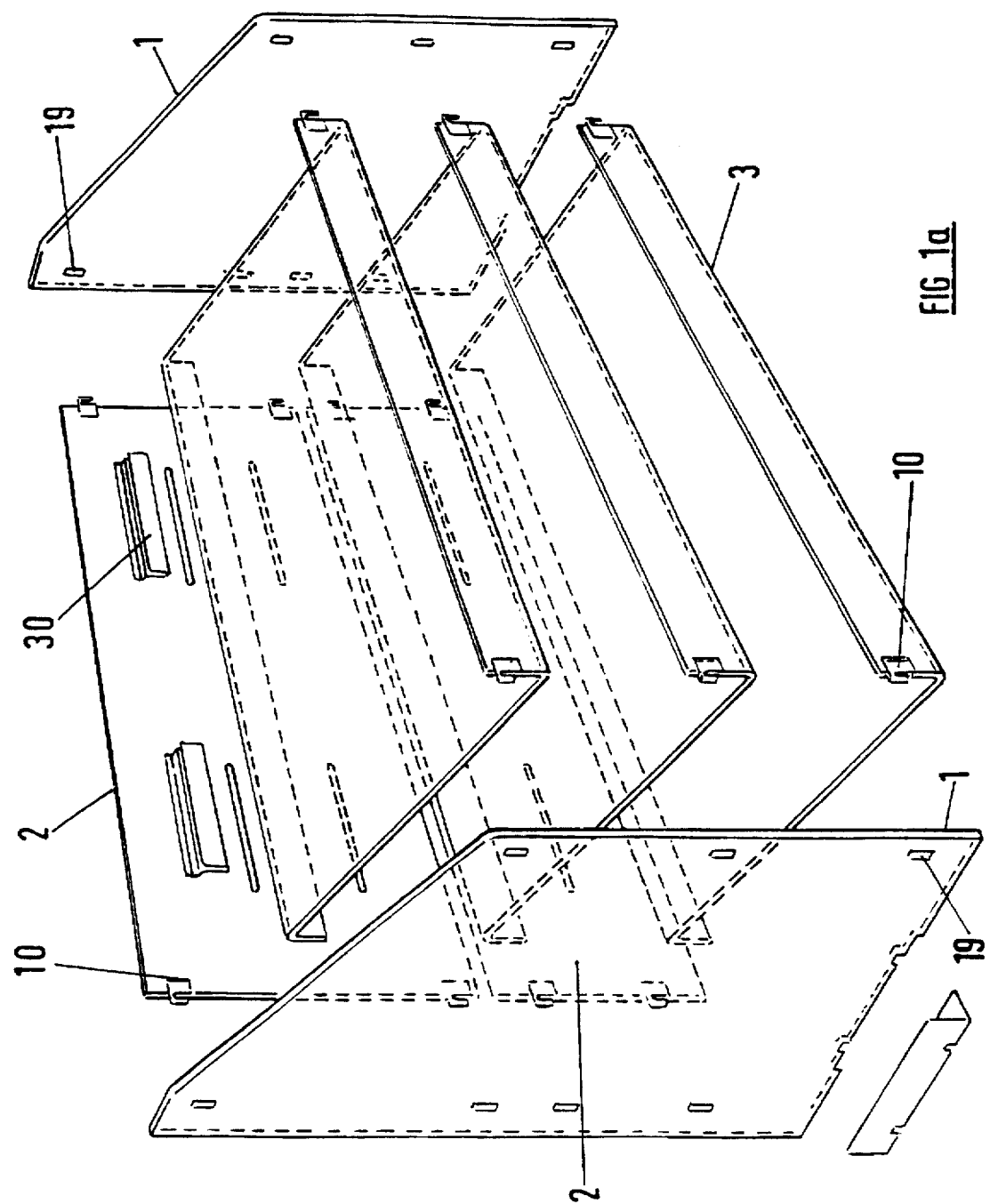
FIG. 1a is an exploded perspective view of one embodiment of construction according to the invention including sloping shelf components which are assembled using the components of the invention as a typical example of a complete structure.
Figure 6B:
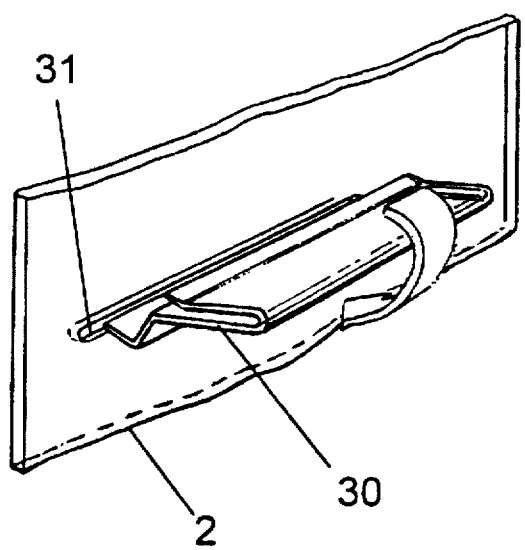
FIGS. 6b and 6c are two perspective views showing the procedure for engaging the bracket to a slotted panel.
Figure 6C:
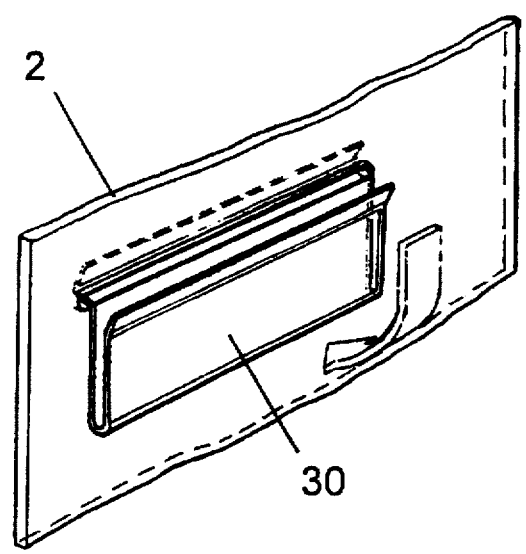
Figure 6A:
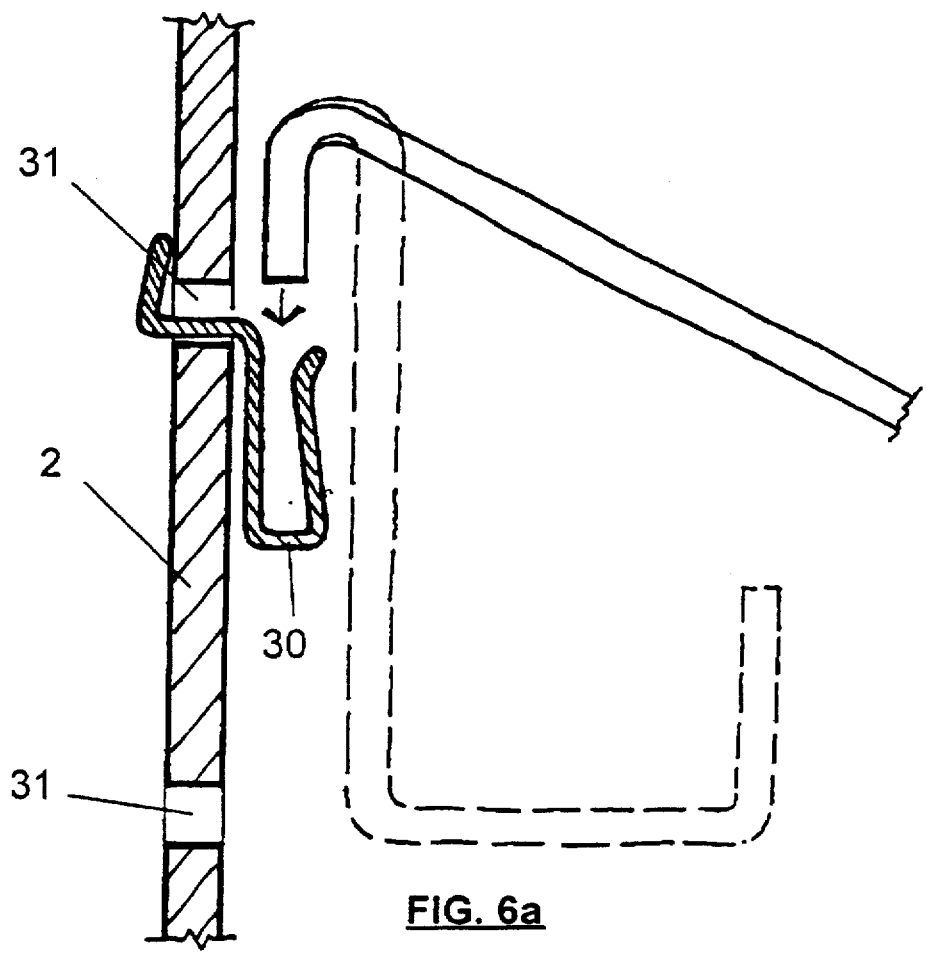
FIG. 6a is an exploded section through a slotted panel of a construction with a hanging bracket engaged thereon.

In the drawings, three basic types of formations are provided on the panels used to produce the constructions, namely:

Type A. twin slots on edges of panels to accommodate injection moulded edge connector clips generally located in back panels and similar (see FIGS. 2a, 3a, 5, 4a or 4c);

Type B. short slots or holes generally located in side panels to accommodate connector clips referred to in A. above (see FIG. 2a); and Type C. longitudinal slots, generally located in back panels, to accommodate an extruded PVC bracket, or similar components, which in turn support the connection of various merchandising systems and various other components to the structure (see FIGS. 1a and 6a).

Figure 1B:
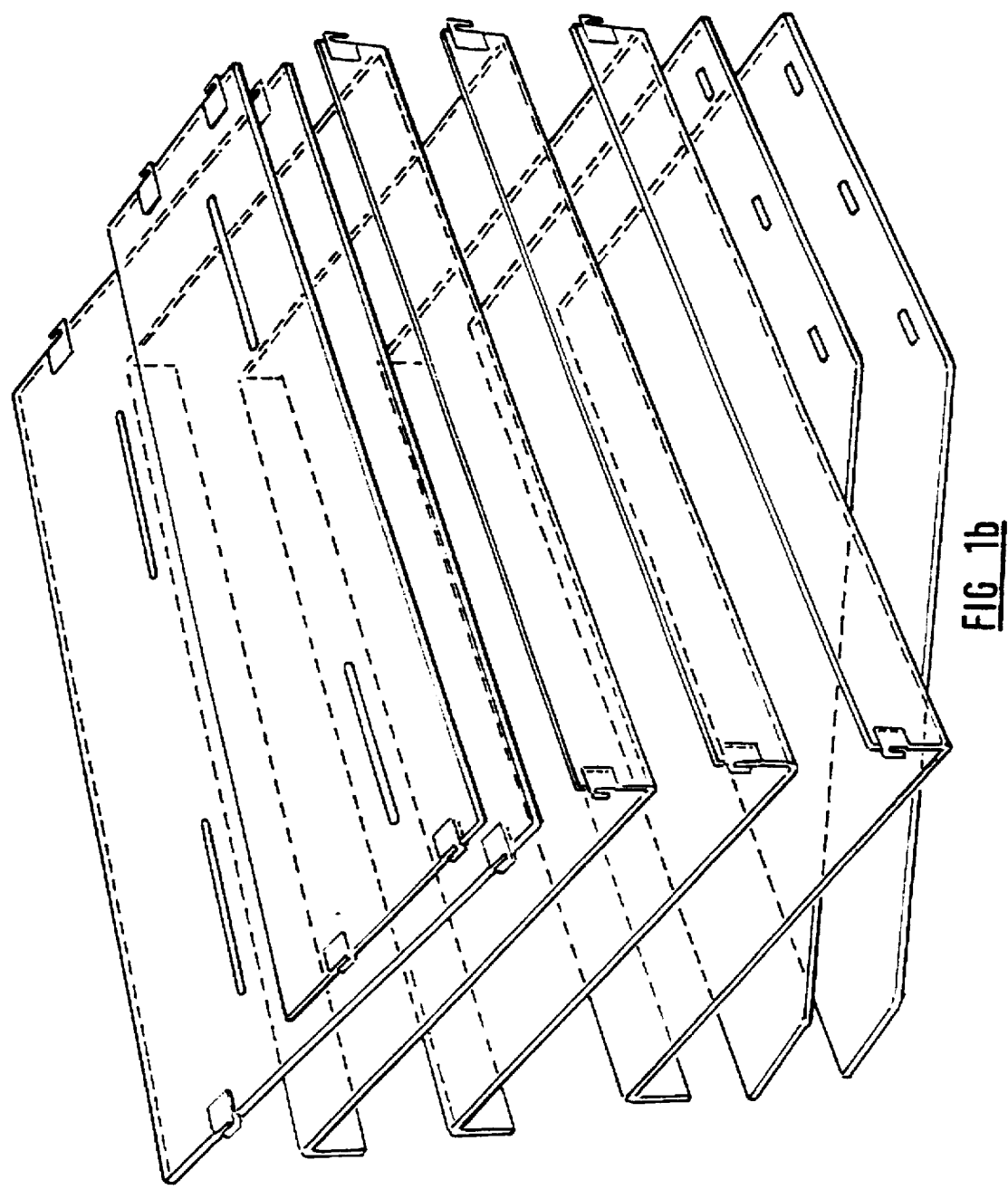
FIG. 1b is a perspective view of the panels of the construction of FIG. 1a orientated for flat packing.
Figure 2B:
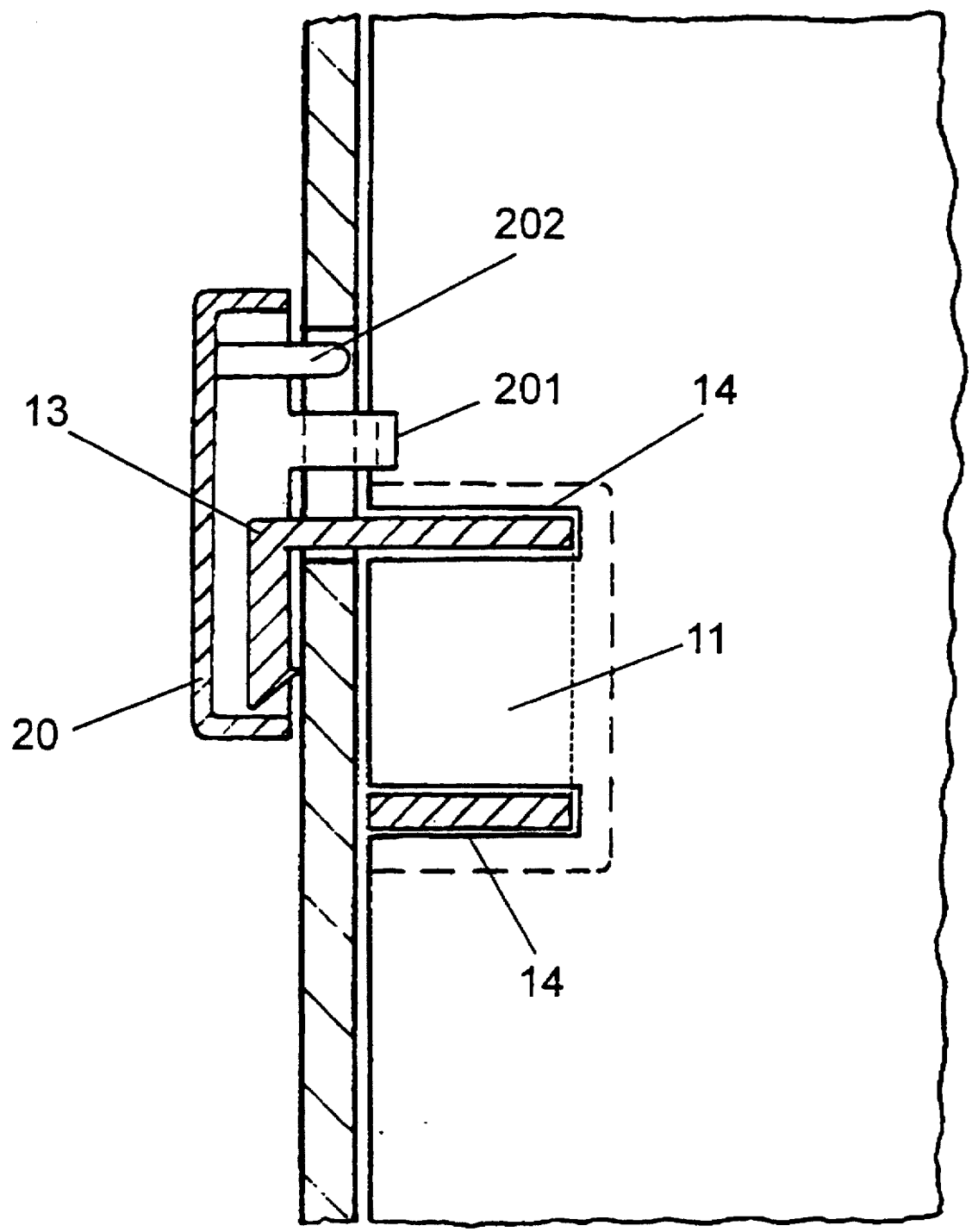

A typical embodiment of display structure constructed according to the invention as shown in FIGS. 1a and 1b comprises two side panels 1, two back panels 2, three sloped shelves 3, all held together by fourteen connectors 10 engaging in orifices 19 in the side panels and six brackets 30 engaging in slots 31 in the back panels 2. A pair of side anchors 40 complete the structure.

Figure 3B:
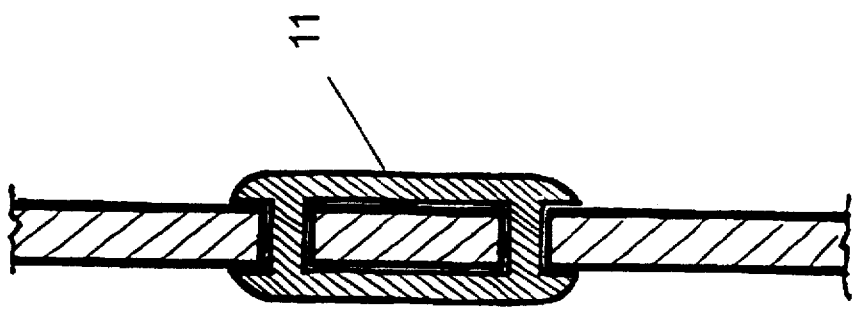
FIG. 3b is a cross-sectional view through the connector and panel.
Figure 3A:
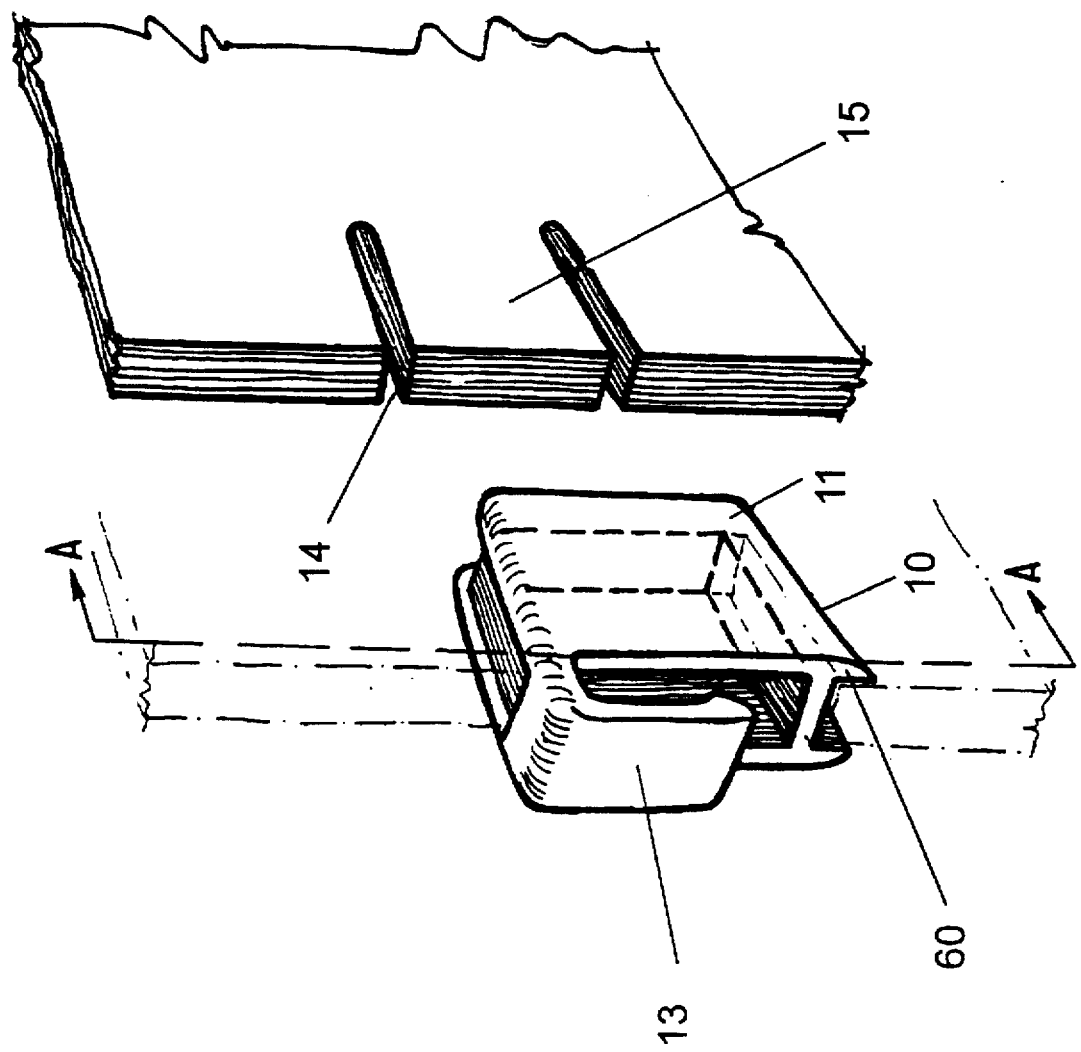
FIG. 3a is an exploded view of the connector clip and the vertical panel on which it is secured.

The edge connectors 10 referred to in Type A, and shown in more detail in FIGS. 2 and 3, each have a socket 11 and a resilient clip 13 and are manufactured from a tough material such as polycarbonate. The socket 11 is hollow in configuration and is driven onto the tongue 15 between the twin slots 14 referred to above and is secured by interference fit friction and can be aided by gluing.

An alternative connector 410, shown in FIGS. 4a and 4b, has a socket 411 with a pair of resilient legs 412, the feet of each of which are formed with an inwardly facing tooth 413. The socket fits into a cut-out 415 in the panel edge and the teeth 413 engage in a slot 414 of the panel as a snap fit when the socket is pressed onto the panel.

Figure 4D:
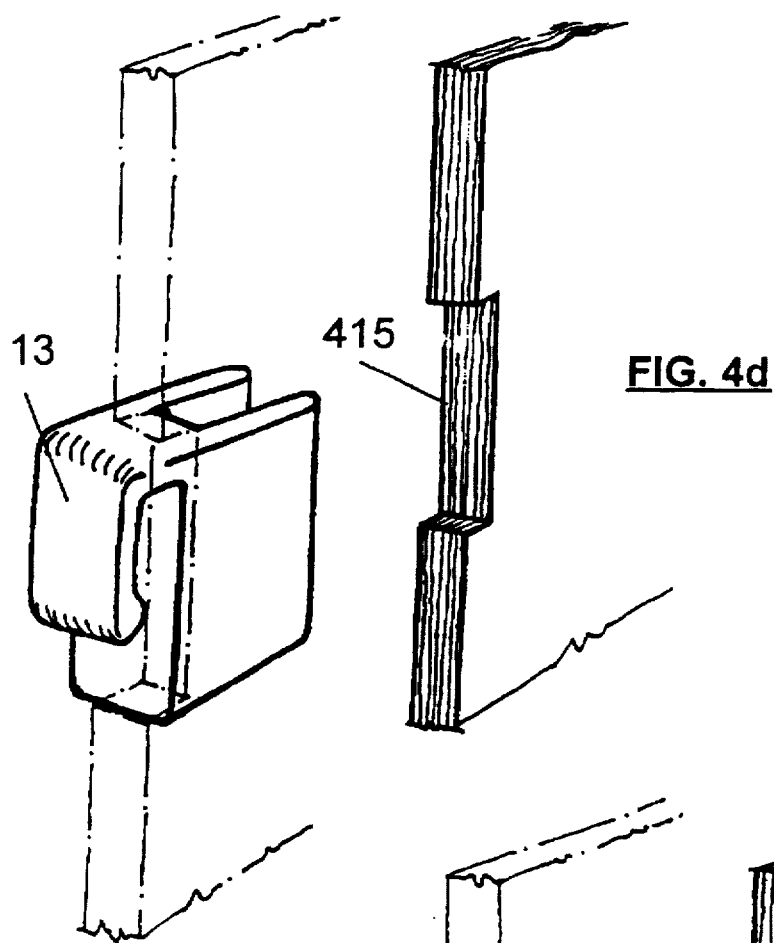
FIG. 4d is an exploded view of a third alternative embodiment of a vertical panel connector clip and panel.
Figure 4C:
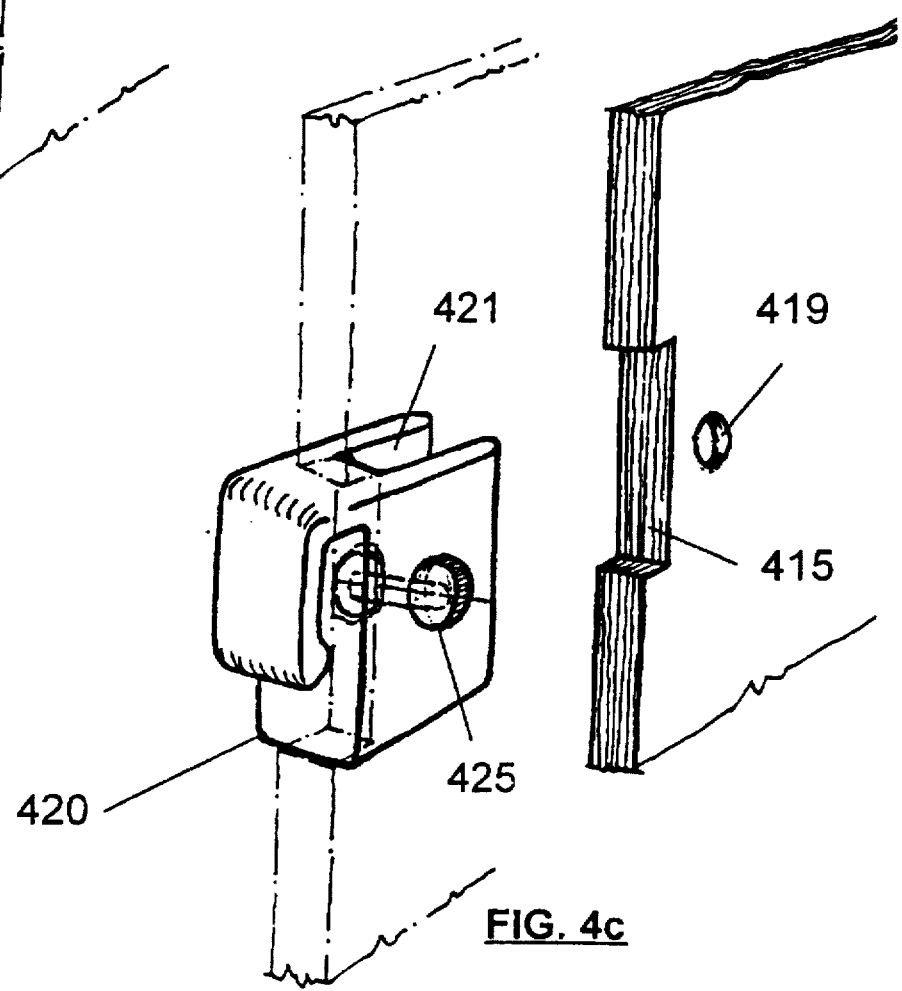
FIG. 4c is an exploded view of a second alternative embodiment of a vertical panel connector clip and panel.

A second alternative connector 420 as shown in FIG. 4c has a socket 421 which engages a cut-out 415 in the panel edge and is secured by a blind rivet or pop rivet fixing 425 through hole 419 or can be secured by glue alone on the connecting faces if required.

The third alternative connector 430 as shown in FIG. 4d has a socket 431 which engages a cut-out 415 in the panel edge and is secured on the panel by being glued to the faces of the panel.

Figure 7A:
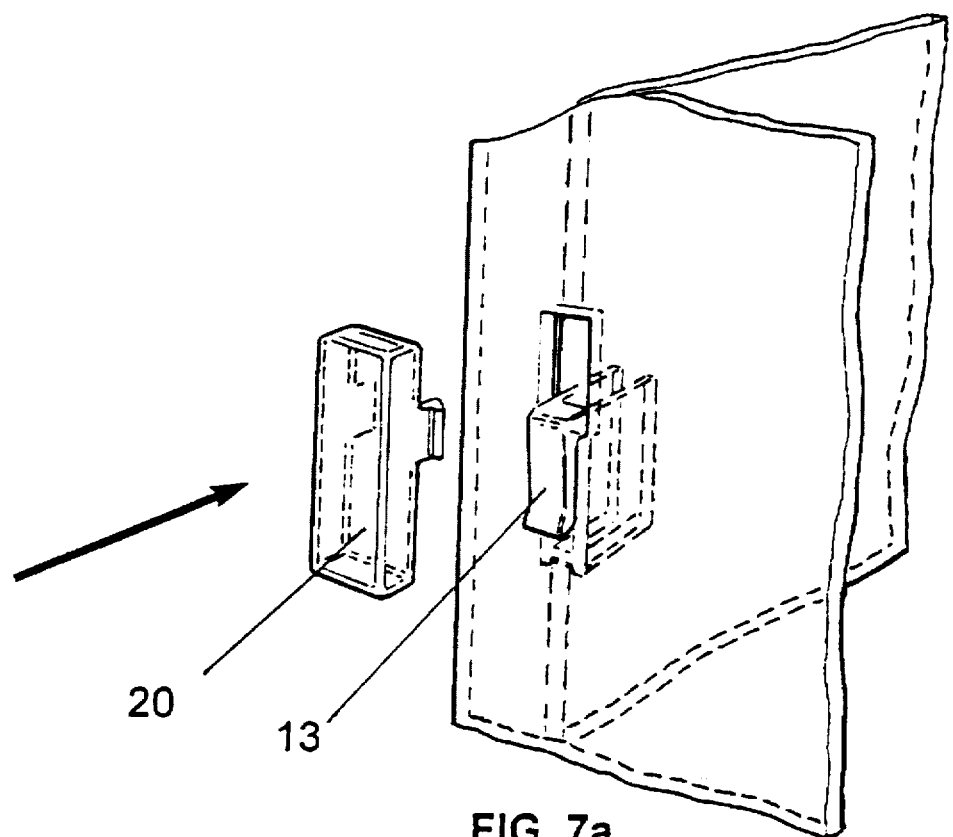
FIGS. 7a and 7b are two perspective views illustrating the attachment of the connector clip and cap.
Figure 7B:
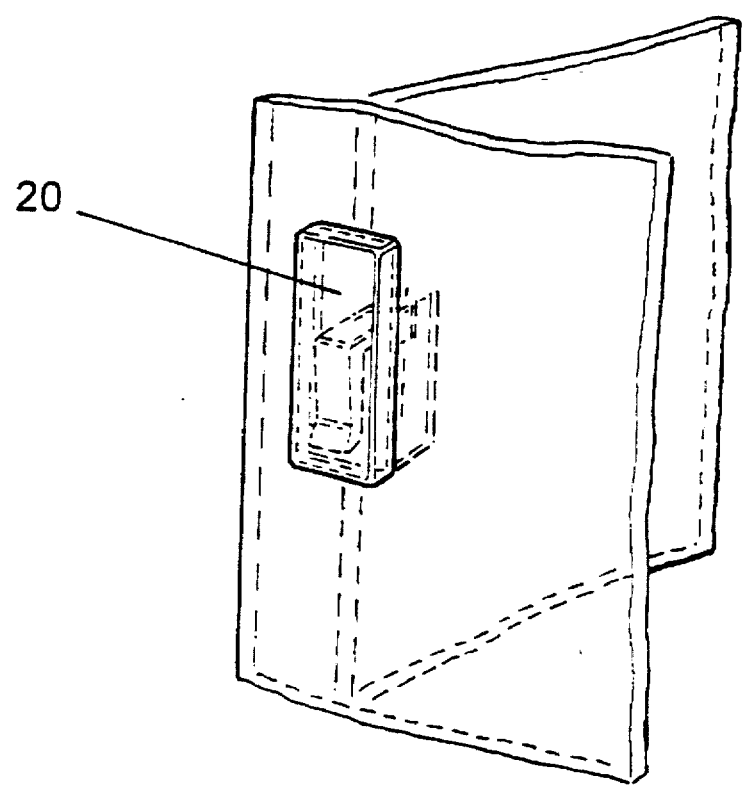

The panels (i.e. back panel 2 and shelves 3) fitted with these connectors 10, 410 or 420 are offered up at right angles to each panel 1 with orifices 19 of type B. The resilient clips 13 of the connectors 10 are pushed through the orifices 19 and pushed downwards into position thus securing the two panels at right angles to one another and forming the basis of the structure. A locking cap 20 (FIGS. 2a and 2b) is pushed into the remaining aperture and prevents the connector from moving upwards in the orifices into a disconnect mode. The cap 20 has a pair of toothed flanges 201 which lock the cap behind the orifice 19, and a locating pin 202. The cap 20 also serves the cosmetic function of covering the connector 10 and orifice 19 in the end panel. FIGS. 7a and 7b more clearly illustrate the procedure.

This assembly process is repeated to complete the required three sided structural support configuration.

Referring to FIGS. 6a, 6b and 6c, the extruded plastic (or similar) bracket profile 30 (Type C), with dog-leg configuration, is offered up to a longitudinal slot 31 in back panel 2 and rotated through 90° thus forming a hanger into which various merchandising system components can be connected. This completes the structure in its simplest form.

Numerous variations on this theme can achieve a multiplicity of structures e.g. single, double and multi sided displays but not confined only to those concept ideas.

Figure 5:
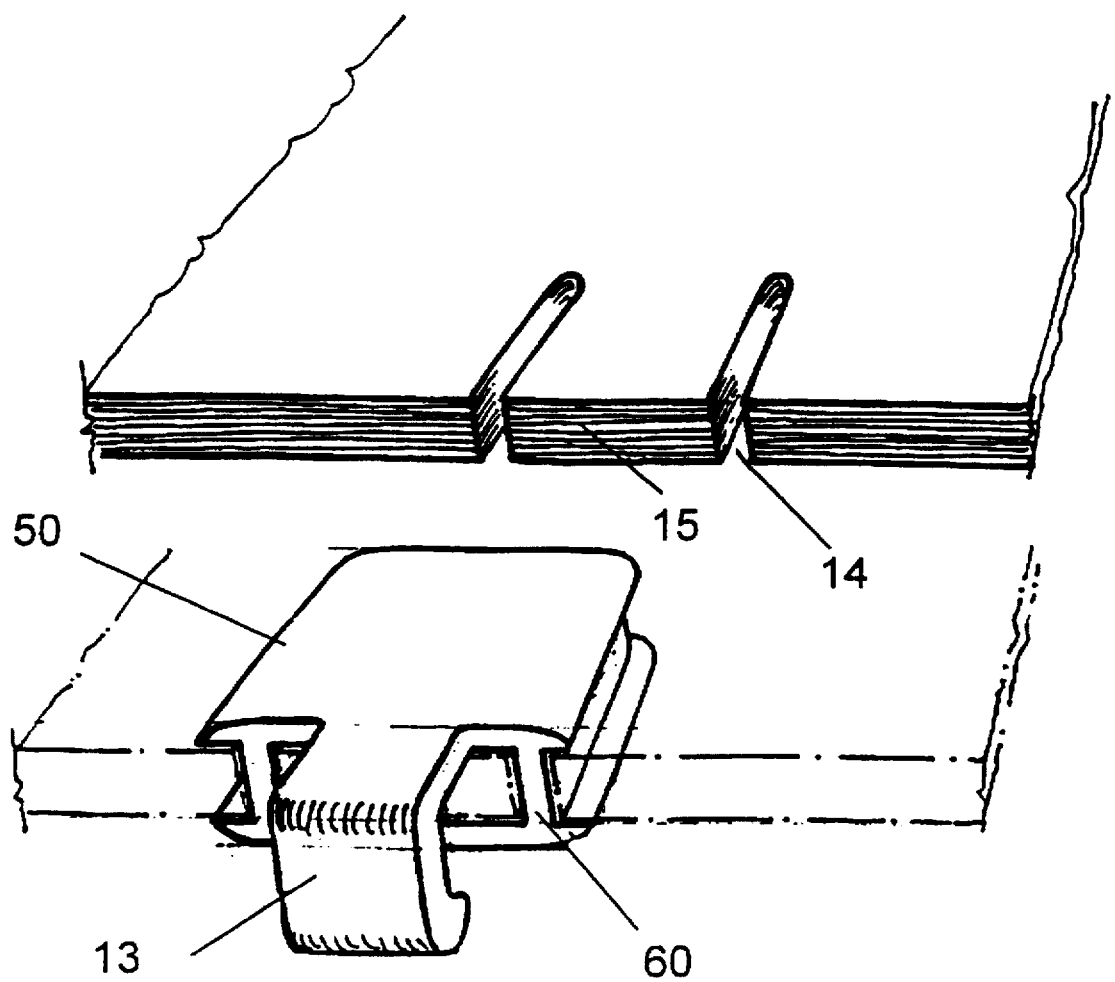
FIG. 5 is an exploded view of a horizontal panel connector.

In FIG. 5, the clip 13 of the connector 50 is rotated by 90° compared to the clip of the connector 10 of FIG. 2a. This enables the connector 50 to support a horizontal member.

Both connector 10 and connector 50 have an extension 60 which extends beyond the slots 14 of the panel so as to strengthen the tongue 15 between the slots 14 and protect it from breaking under side pressure, thus strengthening the overall structure.

Various modifications of the construction are possible. For example, the orifices 19 in the side panels 1 for receiving the connectors 10 may be rectangular, circular or any other suitable shape, and the end cap may be shaped to compliment the apertures. A tie panel between the two side panels 1 may be optionally provided for added stability. This detail is most advantageous where the structure is used to hang demountable components, for example, when the Merchandising Products are not connected to the side panels.

Figure 8A:
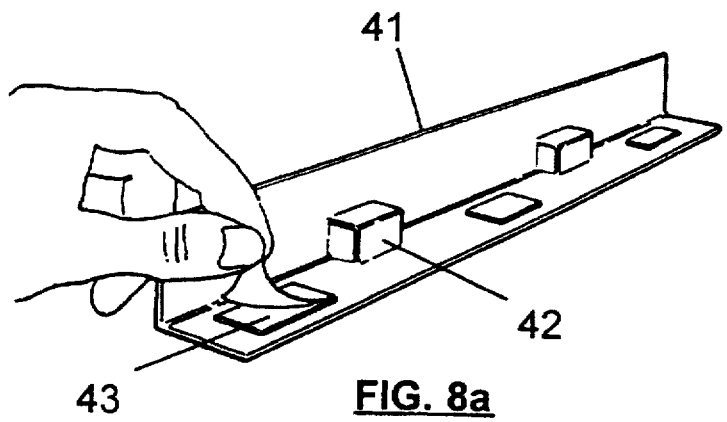
FIGS. 8a and 8b are respectively a perspective view and a side anchor detail used in the structure shown in FIGS. 1a and 1b.
Figure 8B:
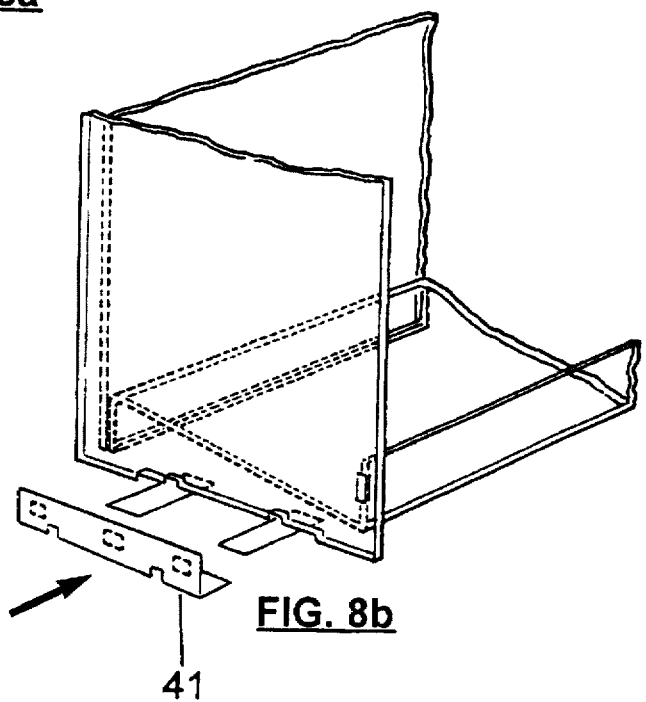
Figure 8C:
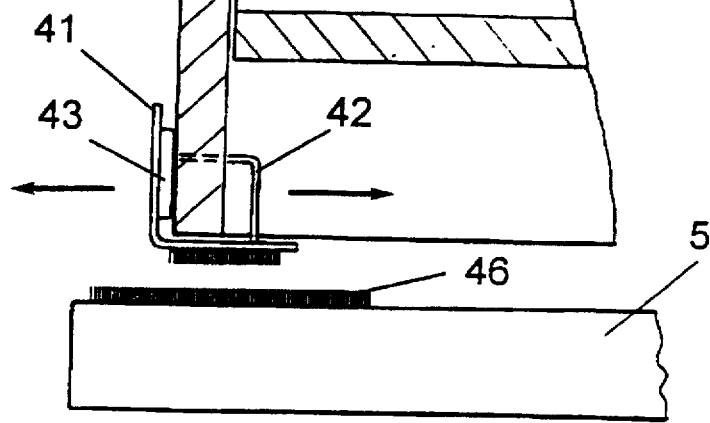
FIG. 8c is a cross-sectional side view through the anchor detail.

In many instore applications, the units thus constructed may be located on flat plinths or flat base shelves of traditional shelving systems. In order to secure the units finally in position, the anchor 40 shown in more detail in FIGS. 8a, 8b and 8c, is used as shown in FIGS. 8a, 8b and 8c.

Each anchor 40 comprises a metal angle 41 (or similar suitable material) with dual punched projections 42 protruding into the body of the angle 41. The angle 41 is provided with adhesive backed sponge pads 43 on the inside face 44 of the angle 41 for connecting to the side panels 2 and VELCRO (Trade Mark) (or similar) strip 46 connected to the underside 47 of the angle. Opposing VELCRO strips 46 are fixed at right angles to side panels 2 on a base surface 5 on which the unit stands. The side panels 2 of the unit are profiled (as illustrated) to accept the angle 41 and protrusions while still remaining flush with the base. The securing of the unit on the plinth or base location is now easily achieved and the position easily adjusted if required.

This detail is of critical importance where the side panels 2 are located near the edge of a plinth or base 5 where the possibility of the load bearing side panel slipping off the base would cause the structure to collapse.

Figure 9A:
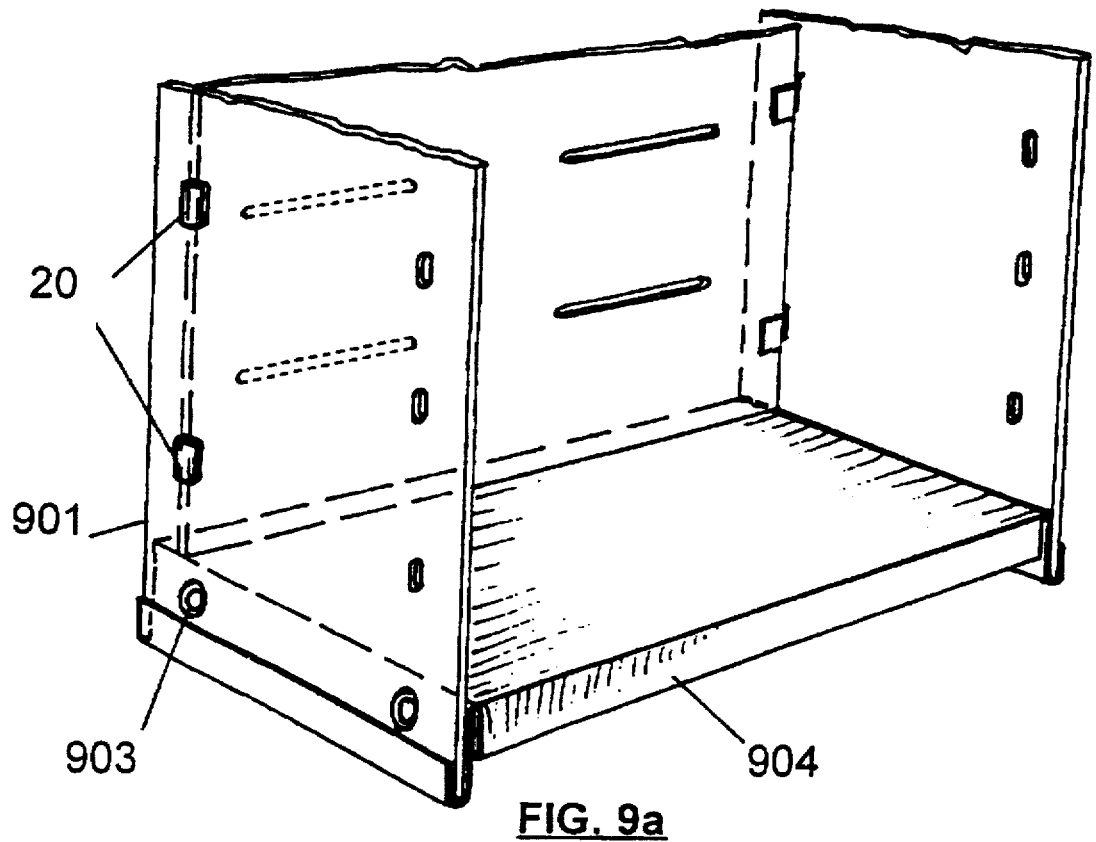
FIG. 9a is a perspective view of a second embodiment of construction according to the invention mounted on a base.
Figure 9B:
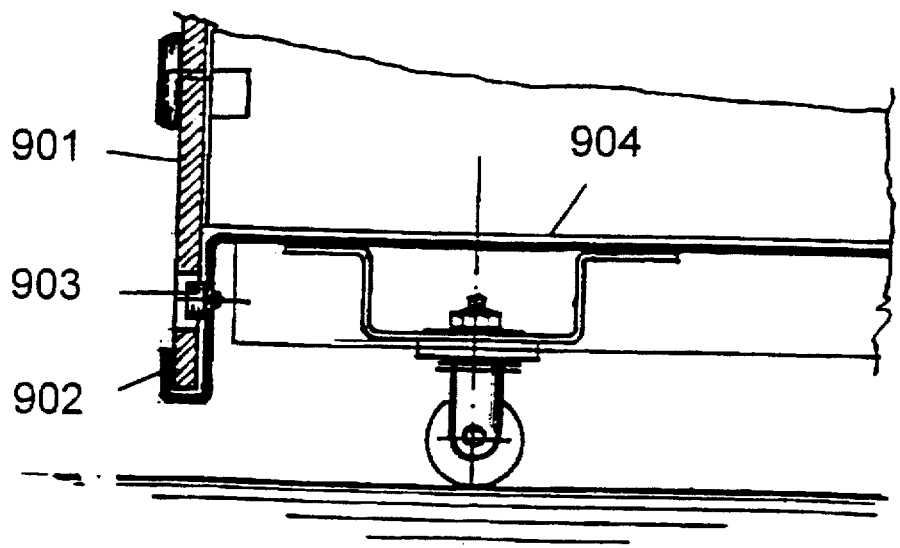
FIG. 9b is a front view of a portion of the second embodiment modified so as to have a mobile base.

In the structure shown in FIGS. 9a and 9b, the side panels 901 are retained in flanges 902 and projection buttons 903 are attached to the base 904. FIG. 9b illustrates the use of castors to make the structure mobile.

Figure 9C:
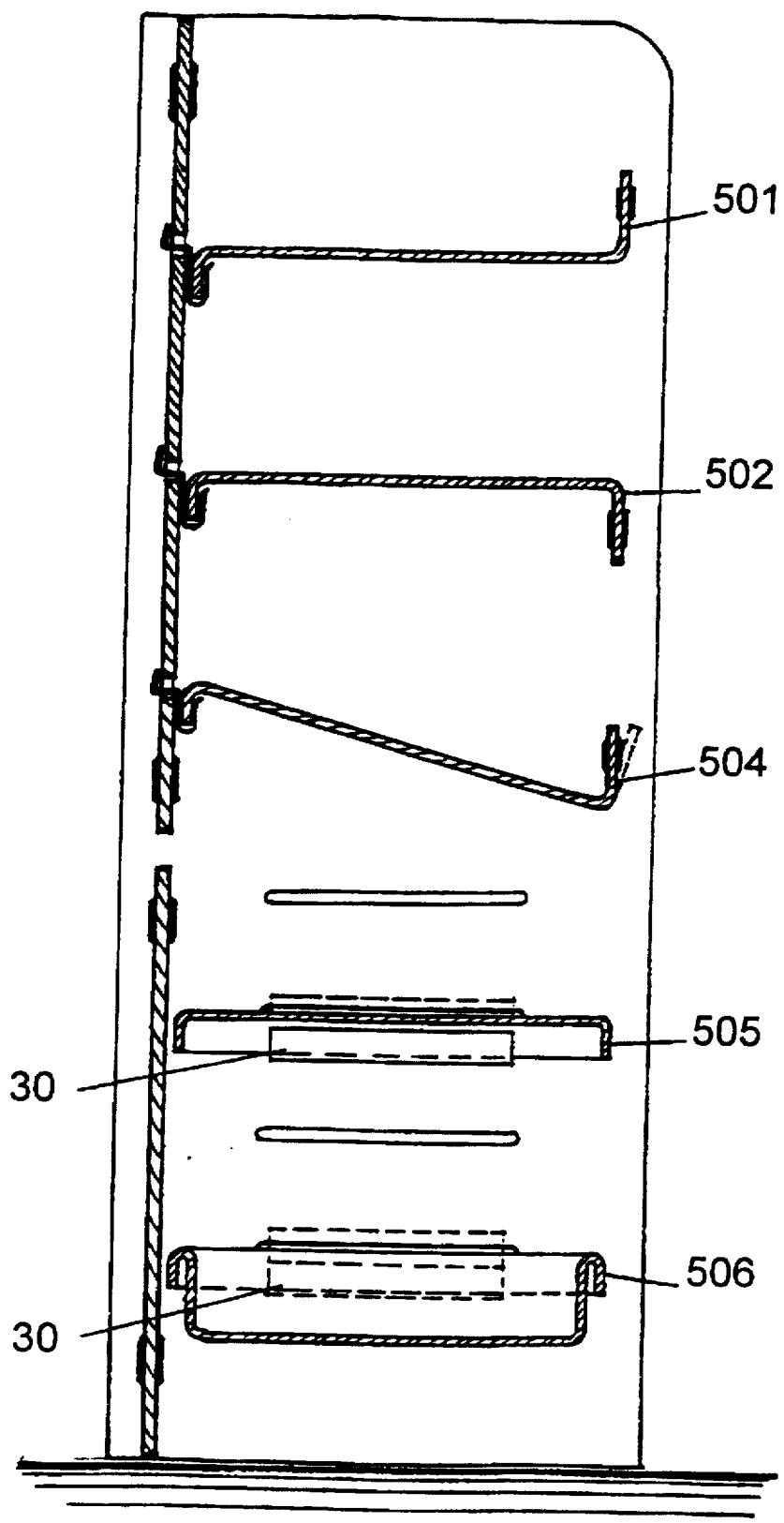
FIG. 9c is a cross-sectional view of a third embodiment of construction showing how various types of merchandising shelves can be accommodated.

FIG. 9c illustrates the various types of merchandising shelves which can be supported by connectors 10 and brackets 30 in a structure constructed in accordance with the invention. In descending order these are:

a horizontal shelf 501 with upstand leading edge horizontal shelf 502 with downturn leading edge sloping shelf 504 with upstand to facilitate gravity feed action to the front of shelf a flat moulded or fabricated flat shelf a dished moulded or fabricated tray type shelf.

Further embodiments of the constructions according to the invention may be made from the components shown in FIGS. 1 to 9c depending on the particular requirements:

One embodiment of a construction according to the invention, known as a cube display 221 is shown in FIGS.

10a to 10c. This cube type merchandising unit is a three sided structure having a back panel 226 connecting two slotted side panels 227, by the connectors described hereinabove. The back panel 226 is provided with spaced slots which enable vertical dividers 223 to be keyed into the back panel 226 at selected intervals. The side panels 227 and dividers 223 are provided with longitudinal slots 225 for receiving a bracket (see bracket 30 of FIGS. 6a to 6c), from which a tray or shelf 222 (or the like) can be suspended, as described in FIG. 6a to 6c. The trays or shelves 222 may be hung at various levels to accommodate the required products in a cube-like structure. The dividers 223 may be unevenly spaced apart to accommodate wider or narrower shelves or trays as desired. For example, as shown in FIGS. 10a and 10b, a narrow tray 222a and a wide tray 222b may be accommodated.

Where two shelves need to be hung side by side and at the same level, the bracket 30 of FIGS. 6a to 6c can not be used. In such an instance, the bracket 228 shown in FIG. 10c may conveniently be used. The bracket 228 is fitted in a longitudinal slot 225 as shown, so that a hanger 228a is provided on either side of the slot 225. A shelf 222 may then be lowered into each hanger 228a to be supported therein.

The construction of FIGS. 10a to 10c offers significant advantages in terms of vertical and horizontal flexibility and of visual variation not found in any prior art cube-type merchandising system (these being generally constructed from glass panels at fixed centres horizontally and vertically).

Figure 11:
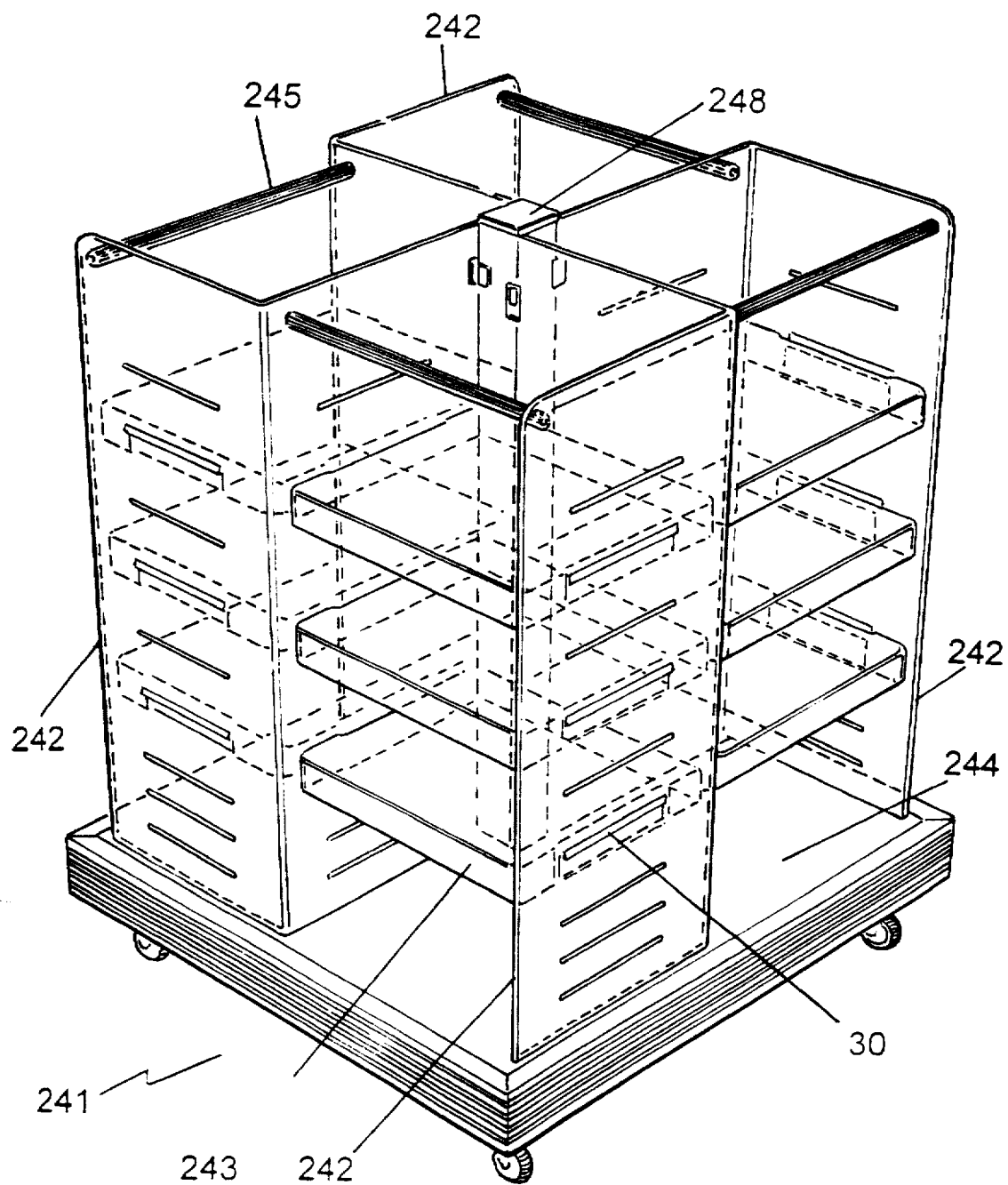
FIG. 11 is a perspective view of a quadrilateral display unit constructed according to the invention (hereinafter referred to as a Quad unit) on a mobile base and including removable flat shelves.
Figure 12C:
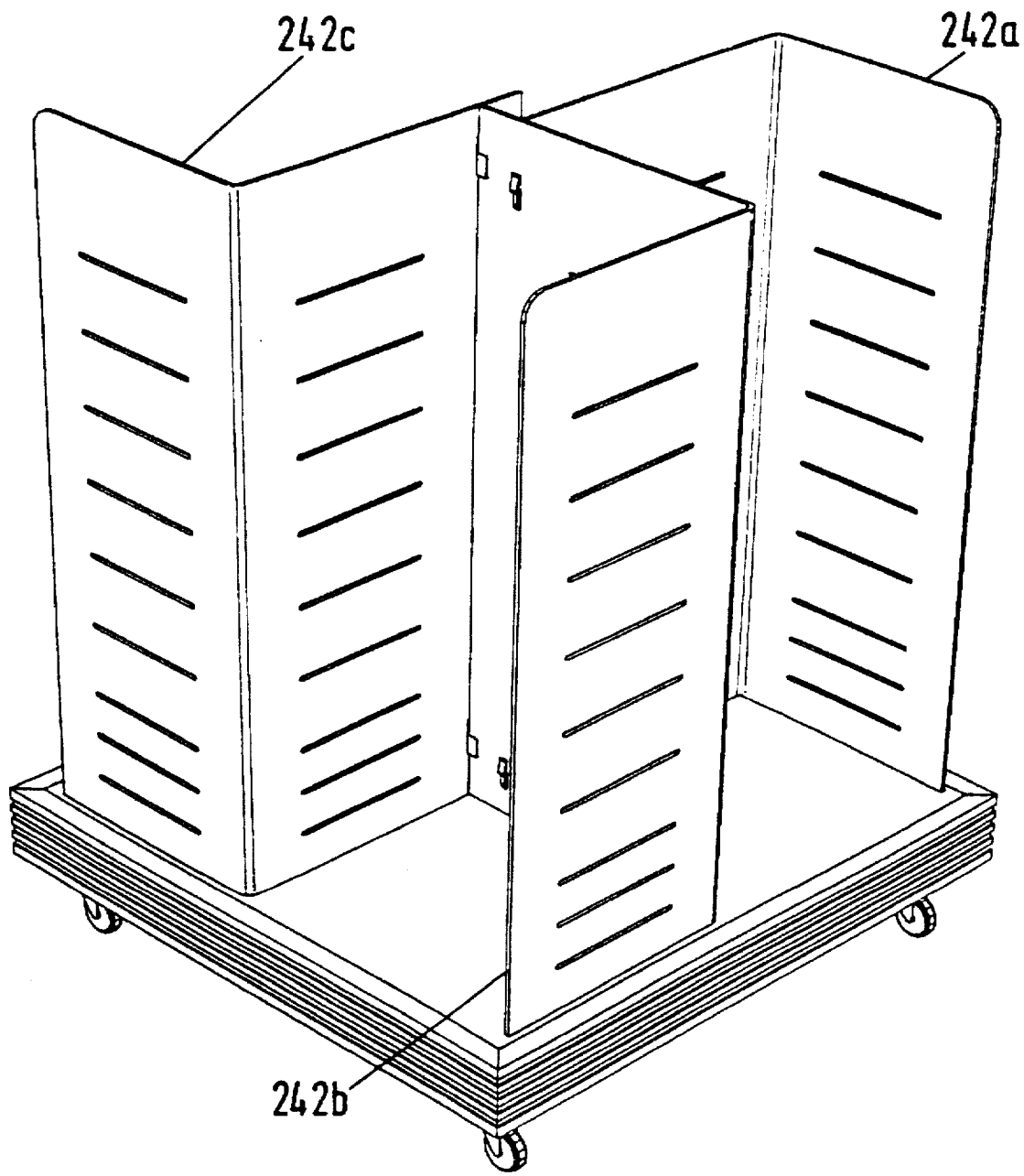
Figure 12D:
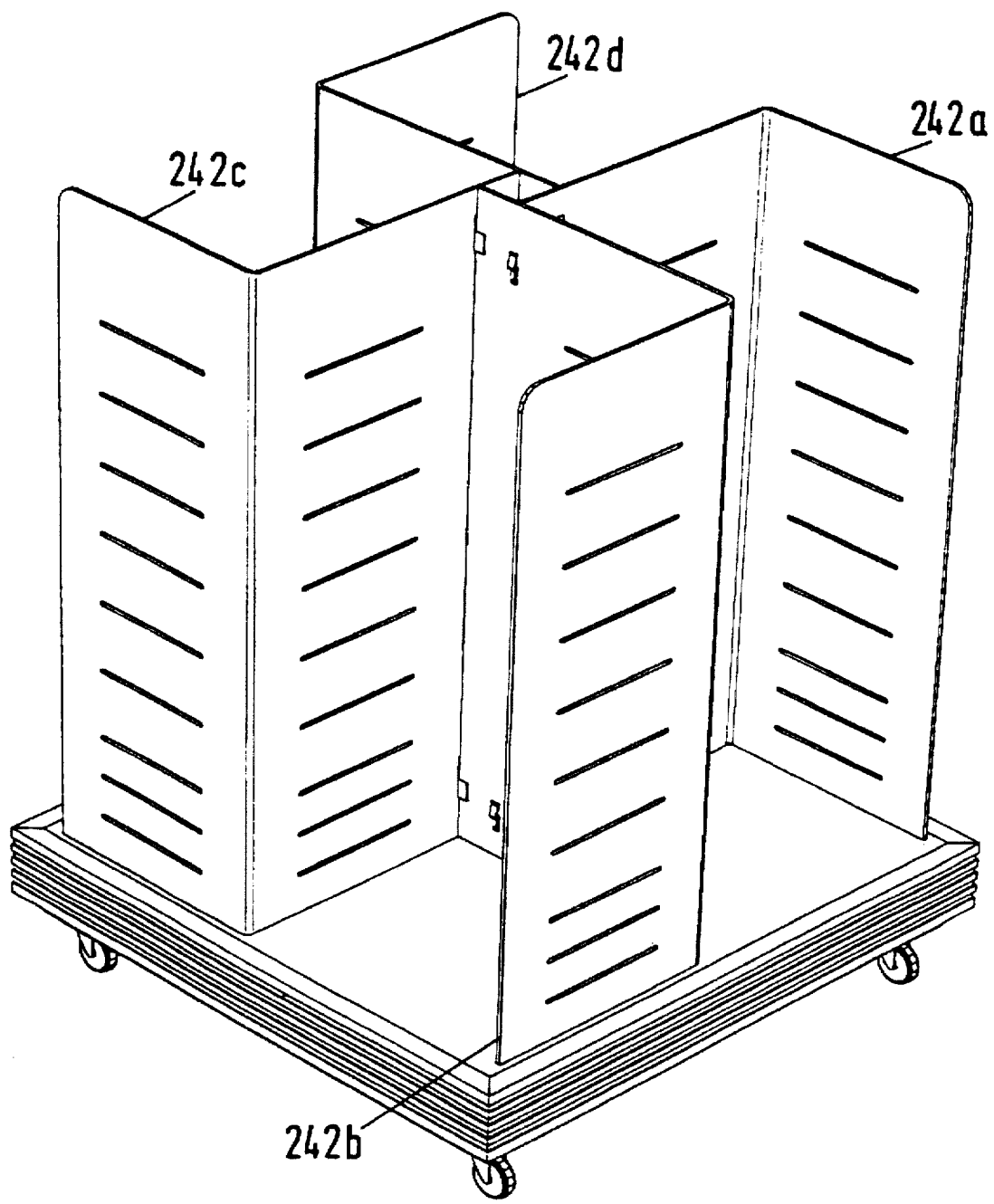

Quad display 244 shown in FIG. 11 has four L-shaped vertical panels 242 hooked into one another by connectors 10 and set into a slotted base unit. A number of vacuum formed shelves 243 are supported by brackets 30 positioned as required in slotted side panels 242. Rods 245 secured by screws at the leading edges of each section tie in the entire structure. The assembly procedure is shown in FIGS. 12a to 12d. The first panel 242a is inserted and locked into a first base slot 247 in the base 244 (see detail FIG. 12e) with the clips 13 of the connectors 10 facing upwardly. The second panel 242b, with clips 13 facing downwards, is inserted into a second base slot 247 and connected to the first panel 242a by connectors 10. The third panel 242c is inserted into a third base slot 247 with the clips 13 facing upwardly and connected to the second panel 242b by connectors 10. A fourth panel 242d is then inserted into a fourth base slot 247 with the clips 13 facing downwardly and connected to the third and first (242c, 242a) by connectors 10. into slots in panel 242c. The assembly FIGS. 12a to 12d show that the connectors 10 on alternative panels must be facing upwards and downwards in order that the final assembly can be completed. An enlarged detail of the locking connection between side panels 242 and base 244 is shown in FIG. 12e. Each of the panels 242 is provided with slots 31, each of which can accommodate a bracket 30 in order to support the shelves 243. The placing of these shelves in each quadrant completes the locking mode of side panels and base.

Alternatively, the shelf components as illustrated can be replaced in any one of the quadrants with recessed trays, tiered racks, gravity feed shelves or any other form of merchandising systems or components as required.

The core void 248 created by the junction of its four side panels can be used to accept point-of-sale assembly, post for support of cosmetic umbrella treatment or similar P.O.S. treatment.

The four sided Quad unit is suitable for merchandising various products such as newspapers, duvets, pillows, magazines, fruits, snacks, etc. and is generally supported by static or mobile metal or timber base.

Numerous other regular or irregular multi-sided configurations can be built using this construction according to the invention depending on the merchandising or display requirements for the consumer products and depending on their size, packaging, stock holding or stock limiting requirements, etc. While shown as generally L-shaped, it will be appreciated that the panels 242 may have other shapes, for example U or other shapes.

In FIGS. 13a, 13b and 13c, a multi-sided construction 291 includes a number of flat panels 292 engaged in elongate supports 293a, 293b. Slots 295 are provided in the wall of each support 293a, 293b. Connectors 10 fixed to a panel 292 can engage the slots 295 to fix the panel 292 to the support 293a, 293b. The support 293a has a square cross-section, allowing a cruciform structure of panels 292 to be supported from it, if desired. The support 293b is octagonal. It will be appreciated that any geometric shape may be used, including circular, rectangular and polygonal cross-sectional structures and including V-sections, U-sections and other open shaped elongate supports. The elongate support may be manufactured from any suitable material, for example plastics, aluminium or steel, in extruded or rolled form or similar.

Any of the constructions described may be fabricated from clear or tinted plastics material, or any other suitable lightweight thin, flat panel material as specified previously.

It will of course be understood that the invention is not limited to the specific details described herein, which are given by way of example only, and that various modifications and alterations are possible within the scope of the invention as defined in the appended claims.

I claim:

1. A construction comprising at least a first and second thin panel (1,2) of a lightweight material disengageably connected together by a connector means (10), said connector means (10) including a connector (10) having a first and second portion (11,13), wherein the first portion (11) is rigidly secured to the first panel (2) and the second portion (13) is disengageably connected to the second panel (1), and wherein the first portion of the connector is in the form of a socket (11) securable to a formation (15) on the first panel (2) and the second portion is in the form of a resilient clip (13) extendable through the orifice (19) and resiliently engageable across the thickness of the second panel (1).

2. A construction according to claim 1, wherein the formation on the first panel comprises a tongue (15) formed between two slots (14), and the socket (11) is engageable over the tongue (15) and is securable thereto by an interference fit, glue, mechanical or any other suitable fixing means.

3. A construction according to claim 1, wherein the socket includes two pairs of flanges (60), one at each side thereof, with each flange extending beyond the slots (14) forming the tongue (15) on the first panel (2) so as to reinforce the tongue (15) and consequently the structure.

4. A construction according to claim 1, wherein a plug, cap, or similar element (20) is inserted into the orifice (19) to prevent disengagement of the two panels.

5. A construction according to claim 1, wherein the formation on the first panel comprises a slot (414) and the socket (411) is engageable with the slot (414) by complementary fixing means, such as snap-fit teeth (413), the first panel (2) being provided with a cut out portion (415) in its edge into which the socket (411) nests to provide a flush edge in the finished construction.

6. A construction according to claim 1, wherein the structure formed by the panels connected together is provided with additional means (30) to support a particular merchandising apparatus, equipment, device or component parts of same.

7. A construction comprising at least a first and second thin panel (1,2) of a lightweight material disengageably connected together by a connector means (10), said connector means (10) including a connector (10) having a first and second portion (11,13), wherein the first portion (11) is rigidly secured to the first panel (2) and the second portion (13) is disengageably connected to the second panel (1) through an orifice provided in the second panel (1), and a bracket (30) connected to at least one of the first and second panels, the bracket (30) being further connected to and supporting a third panel by a socket or channel provided in the bracket, the bracket extending through a slot (31) in one of the first and second panels.

8. A construction comprising at least a first and second thin panel (1,2) of a lightweight material disengageably connected together by a connector means (10), said connector means (10) including a connector (10) having a first and second portion (11,13), wherein the first portion (11) is rigidly secured to the first panel (2) and the second portion (13) is disengageably connected to the second panel (1) through an orifice provided in the second panel (1), and wherein the construction is in the form of a merchandise or display support having at least one cube section (221) comprising at least two merchandise or display support members (222) connected between a pair of generally vertical panels (223).

9. A construction according to claim 8 in which the cube (221) is formed by the interconnection of the pair generally vertically disposed panels (223), a back panel (226) and two merchandise or display support members (222).

10. A construction comprising at least one thin panel (292) of a lightweight material and an elongate hollow body (293) of a lightweight material disengageably connected together by a connector (10) having a first and second portion, the first portion (11) of the connector being rigidly secured to the thin panel (292), and the second portion (13) being disengageably connected to the hollow body (293) through an orifice (295) provided in the hollow body.

11. A construction as claimed in claim 1 comprising at least two non-planar shaped panels (242) of lightweight material connected together about a central axis (248) by connector means (10) secured through an orifice (19) in each panel, each panel having at least one connector (10), the first portion (11) of which is rigidly secured to a first panel (242a) and the other portion (13) being disengageably connected to a second panel (242b) through an orifice (19) provided on the second panel.

12. A construction according to claim 1, including a base (244) and locking means (247) for securing at least one of the first or second thin panels to the base.

13. A method of assembling a construction for a display support or merchandise support for use in merchandising, the method comprising the steps of:

providing at least a first and second thin panel (1,2);

providing a connector (10) having a socket and a resilient clip (11,13), the resilient clip (13) being resiliently engageable across the thickness of the second panel (1);

providing a formation (15) on the first panel (2);

rigidly securing the socket (11) of the connector (10) to the formation (15);

providing an orifice (19) in the second panel (1);

passing the clip (13) of the connector (10) through the orifice (19); and disengageably connecting the clip (13) of the connector (10) to the second panel (1), thereby disengageably connecting the first and second (1,2) panels together.

14. A construction as claimed in claim 10, wherein the first portion of the connector is in the form of a socket (11) securable to a formation (15) on the panel (292) and the second portion is in the form of a resilient clip (13) extendable through the orifice (295) and resiliently engageable with the hollow body (239).

15. A construction comprising four generally L-shaped panels disengageably connected together about a central axis, a connector associated with each panel, each connector having a first portion and a second portion, the first portion being secured to said associated panel and the second portion being disengageably connected to an adjacently disposed panel through an orifice formed therein.

16. A construction comprising at least a first and second thin panel (1,2) of a lightweight material of a planar or non-planar configuration disengageably connected together by a connector (10) having a first and second portion (11,13), characterized in that the first portion (11) has a pair of elongate faces or legs between which the first panel is rigidly secured, the faces of the first portion being parallel to parallel faces of the first panel secured between the faces or legs and the second portion (13) includes a resilient clip (13) extendable through an orifice (19) in the second panel (1) and resiliently engageable across the thickness of the second panel (1) thereby being disengageably connected to the second panel (1) through the orifice (19) with the first and second thin panels (1,2) being connected together at right angles to one another in the region of the orifice (19).

17. A construction according to claim 14, wherein the faces or legs of the first portion of the connector (10) are the side walls of a socket (11) which are securable to a formation (15) on the first panel (2).

* * * * *